(12) United States Patent
Lee (10) Patent No.: US 11,803,593 B2
(45) Date of Patent: Oct. 31, 2023

(54) SYSTEMS AND METHODS FOR RECEIVING AND PROPAGATING EFFICIENT SEARCH UPDATES IN REAL TIME

(71) Applicant: COUPANG CORP., Seoul (KR)

(72) Inventor: Seung Won Lee, Gyeonggi-do (KR)

(73) Assignee: COUPANG CORP., Seoul (KR)

( * ) Notice: Subject to any disclaimer, the term of this patent is extended or adjusted under 35 U.S.C. 154(b) by 0 days.

(21) Appl. No.: 16/791,413

(22) Filed: Feb. 14, 2020

(65) Prior Publication Data

US 2021/0256071 A1 Aug. 19, 2021

(51) Int. Cl.
*G06F 16/903* (2019.01)
*G06F 16/9032* (2019.01)
*G06F 16/9038* (2019.01)

(52) U.S. Cl.
CPC .... *G06F 16/90335* (2019.01); *G06F 16/9032* (2019.01); *G06F 16/9038* (2019.01)

(58) Field of Classification Search
CPC ........... G06F 16/90335; G06F 16/9032; G06F 16/9038
USPC ......................................................... 707/769
See application file for complete search history.

(56) References Cited

U.S. PATENT DOCUMENTS

| | | | | |
|---|---|---|---|---|
| 5,586,280 | A * | 12/1996 | Simms | G11B 27/328 |
| 6,732,124 | B1 * | 5/2004 | Koseki | G06F 12/0868 |
| | | | | 711/119 |
| 9,009,067 | B1 * | 4/2015 | Scotto | G06Q 30/0207 |
| | | | | 705/15 |
| 10,423,493 | B1 * | 9/2019 | Vig | G06F 16/2322 |
| 10,452,675 | B1 | 10/2019 | Sivasubramanian | |
| 10,528,627 | B1 | 1/2020 | Dunsmore | |
| 2003/0115291 | A1 * | 6/2003 | Kendall | G06F 16/9535 |
| | | | | 709/219 |
| 2008/0120211 | A1 | 5/2008 | Oppenheimer et al. | |
| 2009/0063470 | A1 * | 3/2009 | Peled | G06F 40/295 |

(Continued)

FOREIGN PATENT DOCUMENTS

| | | |
|---|---|---|
| JP | 2005322079 A | 11/2005 |
| JP | 2008508575 A | 3/2008 |

(Continued)

OTHER PUBLICATIONS

Search Report dated Aug. 19, 2020, related to Korean Patent Application No. 10-2020-0055479 (5 pp.).

(Continued)

*Primary Examiner* — Ashish Thomas
*Assistant Examiner* — Abdullah A Daud
(74) *Attorney, Agent, or Firm* — FINNEGAN, HENDERSON, FARABOW, GARRETT & DUNNER LLP (57) ABSTRACT

A system for receiving and propagating efficient search updates includes one or more processors configured to receive, from a first external system via a network, a first entity change request to modify data in an entity associated with the first external system. The first entity change request is saved in an entity store. The received entity change request is pushed from the entity store to an event publisher for forwarding to a streaming service. The first entity change request is classified and forwarded, from the streaming service, to a search index database. The search index is then updated based on the classified entity change request.

15 Claims, 7 Drawing Sheets

(56) References Cited

U.S. PATENT DOCUMENTS

| | | | |
|---|---|---|---|
| 2009/0204492 A1* | 8/2009 | Scifo | G06Q 30/0601 705/14.36 |
| 2009/0210459 A1* | 8/2009 | Nair | G06F 16/954 |
| 2009/0313265 A1 | 12/2009 | Sifry | |
| 2010/0131530 A1 | 5/2010 | Gibson et al. | |
| 2011/0023017 A1* | 1/2011 | Calvin | G06F 16/986 717/120 |
| 2011/0264621 A1* | 10/2011 | Burjoski | H04L 61/4552 707/610 |
| 2013/0238706 A1* | 9/2013 | Desai | H04W 4/029 709/204 |
| 2013/0246557 A1* | 9/2013 | Das | H04L 67/63 709/217 |
| 2014/0222641 A1* | 8/2014 | Kober | G06Q 40/04 705/37 |
| 2014/0330767 A1* | 11/2014 | Fowler | G06F 16/288 707/607 |
| 2015/0032688 A1* | 1/2015 | Dayon | G06F 16/951 707/609 |
| 2015/0112988 A1 | 4/2015 | Pereira et al. | |
| 2015/0169579 A1* | 6/2015 | Connor | G06F 16/90335 707/749 |
| 2016/0085967 A1* | 3/2016 | Thomas | G06F 12/1408 713/166 |
| 2017/0372442 A1* | 12/2017 | Mejias | G16H 40/20 |
| 2021/0201386 A1* | 7/2021 | Hsu | G06F 16/9538 |

FOREIGN PATENT DOCUMENTS

| | | |
|---|---|---|
| JP | 2008146664 A | 6/2008 |
| JP | 2013-254513 | 12/2013 |
| JP | 2016057697 A | 4/2016 |
| KR | 1020040063832 A | 7/2004 |
| KR | 101619192 B1 | 5/2016 |

OTHER PUBLICATIONS

Notice of Preliminary Rejection dated Aug. 24, 2020 from the Korean Intellectual Property Office for Korean Application No. 10-2020-0055479, with translation (12 pp.).

Office Action and Search Report, dated Sep. 24, 2021, issued by the Taiwan Intellectual Property Office in R.O.C. Patent Application No. 109145851 (17 pages with translation).

Notice of Preliminary Rejection dated Dec. 20, 2021, from the Korean Intellectual Property Office for Korean Application No. 10-2021-0171154 (5 pp.).

Examination Notice dated Feb. 28, 2022, issued by the Hong Kong Patents Registry for Hong Kong Application No. 22021023329.6 (9 pp.).

Extended European Search Report dated Apr. 26, 2022, in counterpart European Patent Application 20827979.4, 9 pp.

Further Examination Notice in counterpart Hong Kong Application No. 22021023329.6 dated May 15, 2023 (3 pages).

* cited by examiner

SYSTEMS AND METHODS FOR RECEIVING AND PROPAGATING EFFICIENT SEARCH UPDATES IN REAL TIME

TECHNICAL FIELD

Embodiments of the present disclosure relate to systems and methods for receiving and propagating efficient search updates in real time. More particularly, embodiments of the present disclosure relate to enabling users to order items online and deliver the items, by receiving and propagating efficient search updates in real time to a user device.

BACKGROUND

Users (e.g., online customers, online merchants, delivery personnel) often use online website portals or mobile applications to order items (e.g. order food, grocery). By way of example, users maintain profiles including their information (e.g. location information, menu, name) at the online websites. In a situation where a user modifies their profile information, there is a significant time delay or time difference from when the modification was made to when the modification is reflected on an online website portal. As a result the delay in reflecting the modifications, causes inconvenience to the users.

By way of example, when a restaurant updates their online menu contents (e.g. dish name, price of a dish, restaurant hours, etc.) by using an online website portal for a food ordering website, then the change in the online menu would be reflected on the food ordering website after a significant time delay. Current solutions that are utilized for such update processes are not real time as these update requests are processed in batches. Requests are processed by network servers at regular time period, such that, the requests received during those time periods are processed together as a batch, at the end of the time period. Processing of updates by the network servers in batches, results in a significant time delay in reflecting the updates to the users. Accordingly, current solutions are inefficient and generate delays, thus there is a need to reflect updates in real time.

SUMMARY

In accordance with embodiments of the present disclosure, there is provided a system for receiving and propagating efficient search updates, the system comprising: a memory storing instructions; and at least one processor configured to execute the instructions to: receive, from a first external system via a network, a first entity change request to modify data in an entity associated with the first external system; save the received first entity change request to an entity store; push the received entity change request from the entity store to an event publisher for forwarding to a streaming service; classify the first entity change request; forward, from the streaming service, the classified entity change request to a search index database; and update the search index based on the classified entity change request.

In accordance with embodiments of the present disclosure, there is also provided a computer implemented method for receiving and propagating efficient search updates, the method comprising: receiving, from a first external system via a network, a first entity change request to modify data in an entity associated with the first external system; saving the received first entity change request to an entity store; pushing the received entity change request from the entity store to an event publisher for forwarding to a streaming service; classifying the first entity change request; forwarding, from the streaming service, the classified entity change request to a search index database; and updating the search index based on the classified entity change request.

In accordance with embodiments of the present disclosure, there is provided a system for receiving and propagating efficient search updates, the system comprising: a memory storing instructions; and at least one processor configured to execute the instructions to: receive, from a first external system via a network, a first entity change request to modify data in an entity associated with the first external system; save the received first entity change request to an event store; push the received entity change request from the event store to an event publisher for forwarding to a streaming service; push the received entity change request from the event store to a second event publisher for storage in a cache database, wherein pushing the received event change request from the event store to the event publisher and the second event publisher comprises formatting the received entity change request as a snapshot; clear the event store of all entity change requests, responsive to pushing the received entity change request from the event store; classify the first entity change request; forward, from the streaming service, the classified entity change request to a search index database; and update the search index based on the classified entity change request.

BRIEF DESCRIPTION OF DRAWINGS

The accompanying drawings, which are incorporated in and constitute a part of his specification, illustrate disclosed embodiments and, together with the description, serve to explain the disclosed embodiments. In the drawings.

DETAILED DESCRIPTION

Reference will now be made in detail to the disclosed embodiments, examples of which are illustrated in the accompanying drawings. Wherever convenient, the same reference numbers will be used throughout the drawings to refer to the same or like parts.

While the following description is directed to receiving and propagating efficient search updates in real time, these embodiments are made by example only. It should be appreciated that the present disclosure is not limited to the specific disclosed embodiments and details, which are exemplary only. It is further understood that one possessing ordinary skill in the art, in light of known systems and methods, would appreciate the use of the embodiments of the present disclosure for their intended purposes and benefits in any number of alternative embodiments, depending on specific design and other needs.

Figure 1:
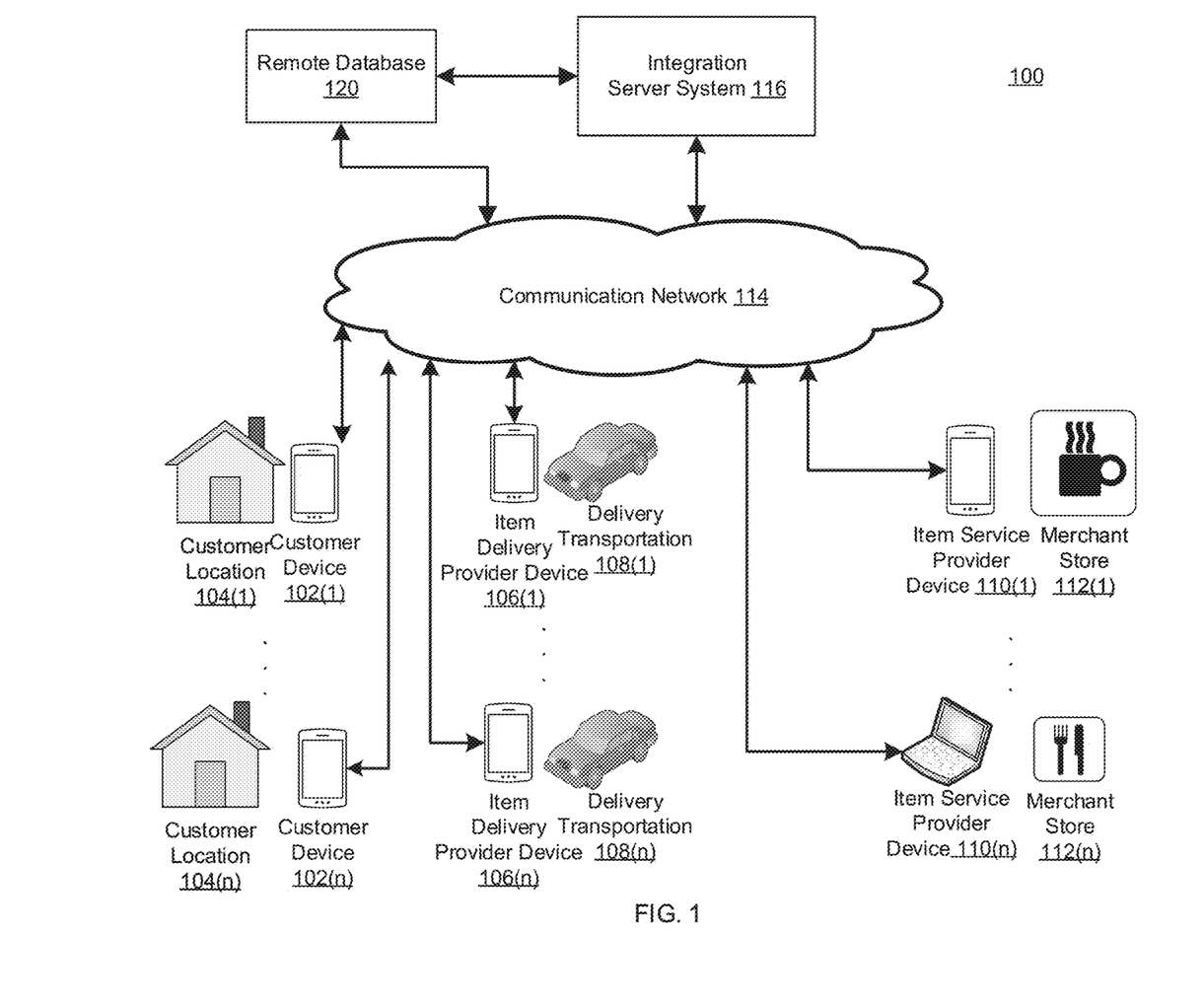
FIG. 1 is a block diagram of an exemplary system, consistent with disclosed embodiments.

FIG. 1 is a block diagram of an exemplary system 100, for performing one or more operations consistent with disclosed embodiments. In some embodiments, system 100 includes one or more customer devices 102(1), . . . 102(n) located at corresponding customer location 104(1), . . . 104(n) respectively, one or more item delivery provider devices 106(1), . . . 106(n) located in corresponding delivery transportations 108(1), . . . 108(n) respectively, one or more item service provider devices 110(1), . . . 110(n) located at corresponding merchant stores 112(1), . . . 112(n). Further, system 100 includes an integration server system 116, a remote database 120 and a communication network 114. The system 100 may also include a plurality of integration server system 116 (not shown in drawings) and a plurality of remote databases 120 (not shown in drawings) communicating with each other directly and further communicating with the customer devices 102(1)-102(n), item delivery provider devices 106(1)-106(n), item service provider devices 110(1)-110(n) via the communication network 114. The components and arrangement of the components included in system 100 may vary. Thus, system 100 may include other components that perform or assist in the performance of one or more operations consistent with the disclosed embodiments.

As more fully described below, customer devices 102(1)-102(n), item delivery provider devices 106(1)-106(n), item service provider devices 110(1)-110(n), integration server system 116, and remote database 120 may include one or more computing devices (e.g., computer(s), server(s), etc.), memory storing data and/or software instructions (e.g., database(s), memory devices, etc.), and other known computing components. In some embodiments, the one or more computing devices may be configured to execute software instructions stored in the memory to perform one or more operations consistent with the disclosed embodiments. Aspects of customer device(s) 102(1)-102(n), item delivery provider device(s) 106(1)-106(n), item service provider devices 110(1)-110(n), integration server system 116 and remote database 120 may be configured to communicate with one or more other components of system 100 via communication network 114, for example. In certain aspects, customers associated with the customer location 104(1)-104(n) are respectively associated with and operate customer devices 102(1)-102(n), drivers associated with the delivery transportations 108(1)-108(n) are respectively associated with and operate item delivery provider devices 106(1)-106(n), merchants associated with the merchant stores 112(1)-112(n) are respectively associated with and operate item service provider devices 110(1)-110(n), to interact with one or more components of system 100 by sending and receiving communications, initiating operations, and/or providing input for one or more operations consistent with the disclosed embodiments.

Integration server system 116 may be associated with an online ordering entity that receives, processes, manages, or otherwise offers ordering services for items. For example, the items that may be ordered via the online ordering entity may include, prepared food, groceries, furniture, books, computers, and/or clothes, although any other type of items may also be ordered. For example, the integration server system 116 may receive order requests from customers using customer devices 102(1)-102(n) and process the received order request by transmitting the request to item service provider devices 110(1)-110(n) associated with merchant stores 112(1)-112(n) that would provide the ordered item. Integration server system 116 receives an order confirmation communication from item service provider devices 110(1)-110(n). Upon receiving the order confirmation from the item service provider devices 110(1)-110(n), integration server system 116 transmits a request to item delivery provider devices 106(1)-106(n), to collect the order from the merchant stores 112(1)-112(n) and deliver the order to customer location 104(1)-104(n). Item delivery provider devices 106(1)-106(n) accepts the requests and collects the requested item and delivers it to the customer location 104(1)-104(n).

Remote database 120 of system 100 may be communicatively coupled to integration service system 116 directly or via communication network 114. Further, the remote database 120 of system 100 may be communicatively coupled to customer devices 102(1)-102(n), item delivery provider devices 106(1)-106(n) and item service provider devices 110(1)-110(n) via the communication network 114. Remote database 120 may include one or more memory devices that store information and are accessed and/or managed by one or more components of system 100. By way of example, remote database 120 may include Oracle™ databases, Sybase™ databases, or other relational databases or nonrelational databases, such as Hadoop sequence files, HBase, or Cassandra. Remote database 120 may include computing components (e.g., database management system, database server, etc.) configured to receive and process requests for data stored in memory devices of remote database 120 and to provide data from remote database 120.

Remote database 120 is configured to store, among another things, merchant profile information for merchants associated with the item service provider devices 110(1)-110(n) located at the merchant stores 112(1)-112(n), customer profile information for customers associated with the customer devices 102(1)-102(n) located at the customer locations 104(1)-104(n) and driver profile information for the drivers associated with the item delivery provider devices 106(1)-106(n). Remote database 120, in some embodiments, stores data entries that include, for example, merchant profile information, customer profile information, and driver profile information.

The merchant stores 112(1)-112(n) may include a restaurant, coffee shop, bookstore, clothing stores, although any other type of stores can also be included. Further, merchant profile information includes merchant store name, store menu, list of items offered by the merchant, pictures of food, pictures of merchant store, categories of items, categories of food, merchants address, merchant store hours, and/or merchants phone number, although any other type of information associated with the merchant can also be included. The customer location 104(1)-104(n) may include a residential location, an office building, an apartment, although any other type of residence can also be included. Further, customer profile information in remote database 120 may include customer name, customers home address, pictures of customer, and/or customer phone number, although any other type of information associated with the merchant can also be included. The delivery transportation 108(1)-108(n) may include a car, bike, truck, bus, although any other type of delivery transportation can also be included. Further, driver profile information includes drivers name, drivers home address, pictures of driver, and/or drivers phone number, make and model of a delivery transportation the driver drives, although any other type of information associated with the driver can also be included.

In one aspect, integration server system 116 may include one or more computing devices, configured to perform one or more operations consistent with disclosed embodiments as described more fully below in relation to FIGS. 4A and 4B and FIG. 5. In one aspect, integration server system 116 may include one or more servers or server systems. Integration server system 116 may include one or more processors configured to execute software instructions stored in a memory or other storage device. The one or more processors may be configured to execute the stored software instructions to perform internet-related communication, online order-based processes, and receiving and propagating efficient search updates in real time. The one or more computing devices of integration server system 116 may be configured to modify and store customer profile information, merchant profile information and/or driver profile information. The one or more computing devices of integration server system 116 may also be configured to communicate with other components of system 100 to receive and propagate efficient search updates in real time. In some embodiments, integration server system 116 may provide one or more mobile applications, web-sites or online portals that are accessible by customer devices 102(1)-102(n), item delivery provider devices 106(1)-106(n), item service provider device 110(1)-110(n) over communication network 114. The disclosed embodiments are not limited to any particular configuration of integration server system 116.

Communication network 114 may comprise any type of computer networking arrangement configured to provide communications or exchange data, or both, between components of system 100. For example, communication network 114 may include any type of network (including infrastructure) that provides communications, exchanges information, and/or facilitates the exchange of information, such as the Internet, a private data network, a virtual private network using a public network, a LAN or WAN network, a Wi-Fi™ network, and/or other suitable connections that may enable information exchange among various components of system 100. Communication network 114 may also include a public switched telephone network ("PSTN") and/or a wireless cellular network. Communication network 114 may be a secured network or unsecured network. In some embodiments, one or more components of system 100 may communicate directly through a dedicated communication link(s).

Customer devices 102(1)-102(n), item delivery provider devices 106(1)-106(n), item service provider devices 110(1)-110(n) may be one or more computing devices configured to perform one or more operations consistent with the disclosed embodiments, as described more fully below in relation to FIG. 2. Customer devices 102(1)-102(n), item delivery provider devices 106(1)-106(n), item service provider devices 110(1)-110(n) may execute browser or related mobile display software that displays an online portal for placing online orders for delivery of items, receiving orders and delivering items that are ordered, on a display included in, or connected to, customer devices 102(1)-102(n). Customer devices 102(1)-102(n) may also store and execute other mobile applications that allow customers, merchants, and/or drivers to interact with an online portal provided by the integration server system 116.

It is to be understood that the configuration of the functional blocks of system 100 has been defined herein for convenience of description. The components and arrangement of the components included in system 100 may vary. For example, in some embodiments, system 100 may include other components that perform or assist in the performance of one or more processes consistent with disclosed methods. System 100 includes a number of components generally described as computing devices. Each of the computing devices may include any number of computing components particularly configured as a special purpose computing device to perform the functionality disclosed herein. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 2:
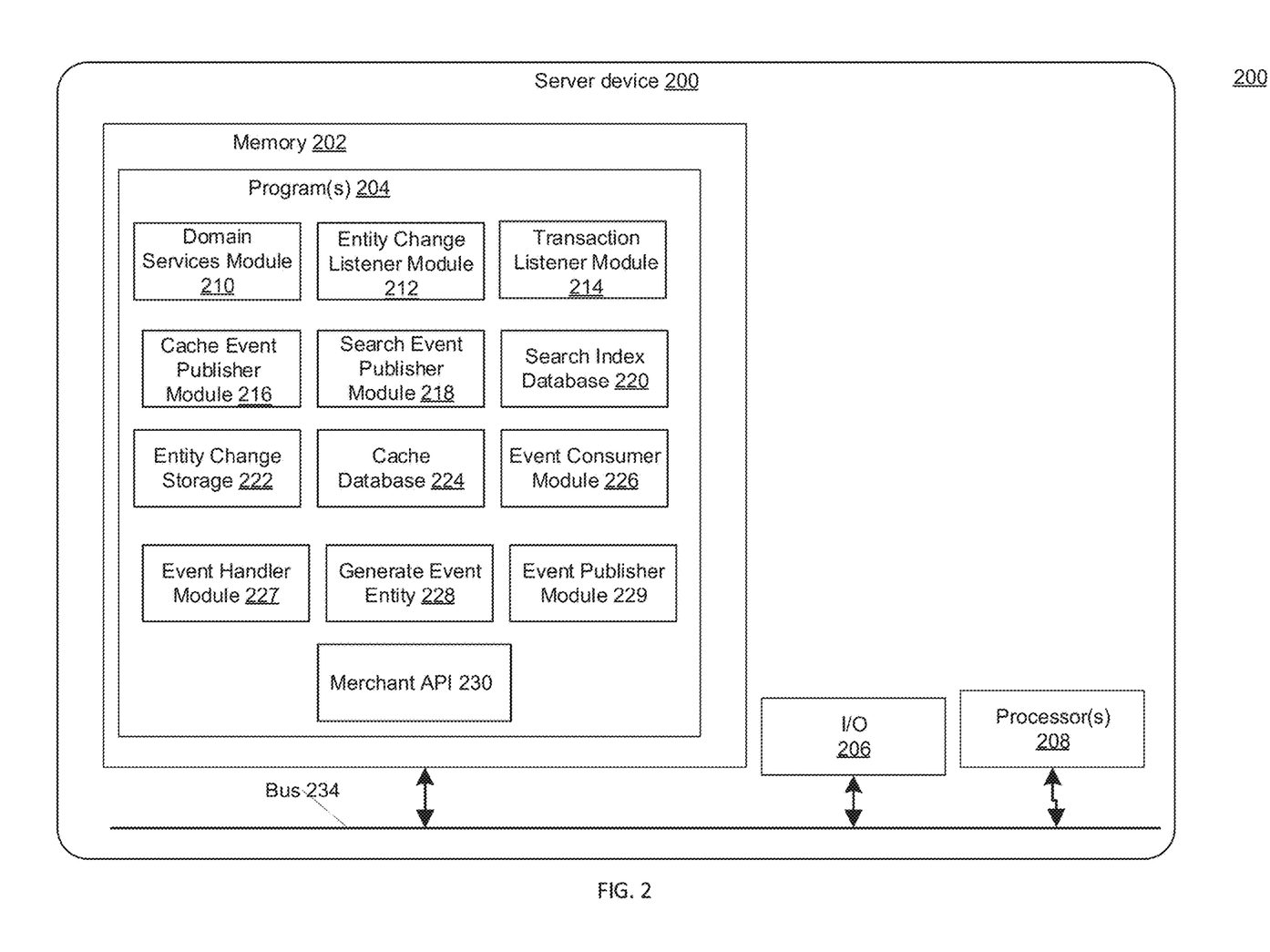
FIG. 2 is a block diagram of an exemplary server system, consistent with disclosed embodiments.

FIG. 2 shows an exemplary server device 200 consistent with the disclosed embodiments. Variations of exemplary server device 200 may constitute one or more components of integration server system 116. In one embodiment, server device 200 includes one or more memories 202, one or more I/O devices 206, and one or more processors 208 communicating via a bus 234. In some embodiments, server device 200 may be a part of integration server system 116. In some embodiments, server device 200 may take the form of a specially programmed server or computing system used by integration server system 116 to perform complete functions of integration server system 116. In some embodiments, server device 200 may be configured as an apparatus, embedded system, dedicated circuit, or the like based on the storage, execution, and/or implementation of software instructions that perform one or more operations consistent with the disclosed embodiments.

Memory 202 may include one or more storage devices configured to store instructions used by processor 208 to perform functions related to disclosed embodiments. For example, memory 202 may be configured with one or more software instructions, such as program(s) 204 that may perform one or more operations when executed by processor 208. The disclosed embodiments are not limited to separate programs or computers configured to perform dedicated tasks. For example, memory 202 may include a single program 204 that performs the functions of server device 200, or program 204 may comprise multiple programs. In certain embodiments, memory 202 may store sets of instructions or programs 204 for performing functions of integration server system 116. These sets of instructions may be executed by processor 208 to perform communication and/or processes consistent with disclosed embodiments.

In certain embodiments, when server device 200 constitutes one or more of the components of integration server system 116, memory 202 includes a domain services module 210, entity change listener module 212, transaction listener module 214, cache event publisher module 216, search event publisher module 218, search index database 220, entity change storage 222 and cache database 224, as described in detail below.

In other embodiments, each of the domain services module 210, entity change listener module 212, transaction listener module 214, cache event publisher module 216, search event publisher module 218, search index database 220, entity change storage 222 and cache database 224, may be implemented as separate and individual servers communicating with each other, remote database 120 and customer devices 102(1)-102(n), item delivery provider devices 106(1)-106(n), item service provider devices 110(1)-110(n) over communication network 114. In another example, search index database 220, entity change storage and cache database may be hosted at remote database 120.

Input/output (I/O) 206 may include various input/output devices, such as a keyboard, a mouse-type device, a gesture sensor, an action sensor, a physical button, switch, microphone, touchscreen panel, stylus, etc., that may be manipulated by customer devices 102(1)-102(n), item delivery provider device 106(1) and/or item service provider device 110(1)-110(n). I/O devices 206 may also include an audio output device. Exemplary communication modules of I/O devices 206 may include, for example, a short-range or near field wireless communication modem, a Wi-Fi™ communication modem, or a cellular communication modem. I/O devices 206 may include a transceiver or transmitter configured to communicate using one or more wireless technologies/protocols that may include, without limitation, cellular (e.g., 3G, 4G, etc.) technology, Wi-Fi™ hotspot technology, RFID, near-field communication (NFC) or BLUETOOTH® technologies, etc. More generally, any uni- or bi-directional communication technology known to one of ordinary skill in the art may be implemented in server device 200 to exchange information with integration server system 116, customer devices 102(1)-102(n) item delivery provider device 106(1), item service provider device 110(1)-110(n) or remote database 120 via communication network 114.

Processor 208 may include one or more known processing devices, such as a microprocessor from the Pentium™ or Xeon™ family manufactured by Intel™, or the Turion™ family manufactured by AMD™, for example. The disclosed embodiments are not limited to any type of processor(s) otherwise configured to meet the computing demands required of different components of system 100.

Figure 3:
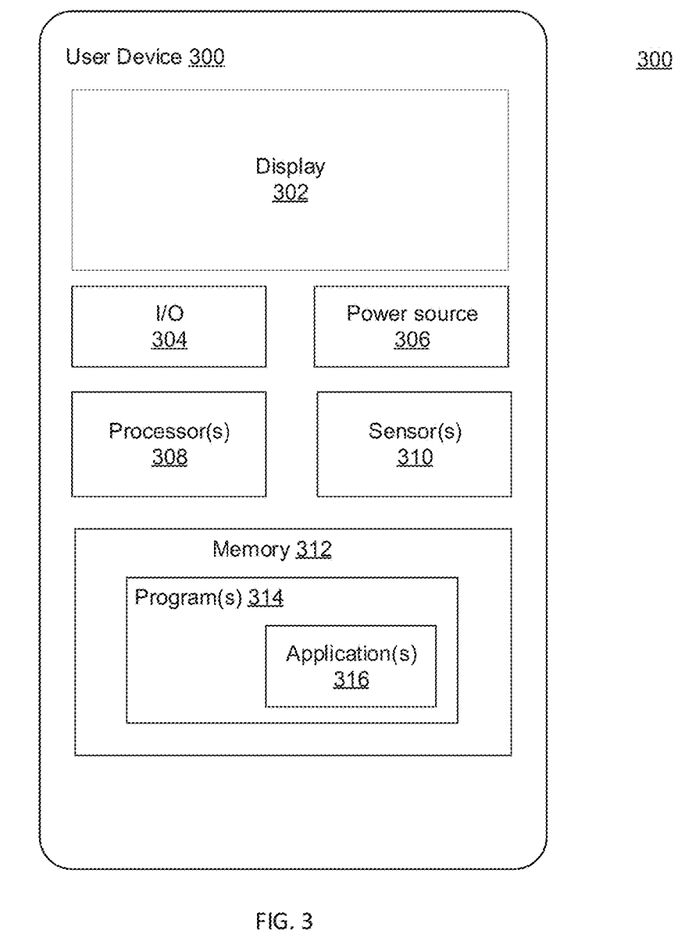
FIG. 3 is a block diagram of an exemplary user device, consistent with disclosed embodiments.

FIG. 3 shows an exemplary configuration of user device 300, consistent with disclosed embodiments. User device 300 of FIG. 3 represents an exemplary configuration of each of the customer devices 102(1)-102(n), the item delivery provider devices 106(1)-106(n) and item service provider devices 110(1)-110(n).

User device 300 may enable associated customers, drivers and merchants associated with customer devices 102(1)-102(n), the item delivery provider devices 106(1)-106(n) and item service provider devices 110(1)-110(n), respectively to, for example, perform remote interactions or mobile transactions with integration server system 116, or receive information from integration server system 116. In some embodiments, user device 300 may be a personal computing device. For example, user device 300 may be a smartphone, a laptop or notebook computer, a tablet, a multifunctional watch, a pair of multifunctional glasses, or any mobile or wearable device with computing ability, or any combination of these computers and/or affiliated components.

User device 300 includes one or more processors 308 configured to execute software instructions stored in memory, such as a memory 312. Memory 312 may store one or more software programs 314 that when executed by processor 308 perform known Internet-related communication, content display processes, and other interactive processes for customers, drivers and/or merchants. For instance, user device 300 may execute a browser or related mobile display software that generates and displays interfaces including content on a display device 302 included in, or in communication with, user device 300. User device 300 may be a mobile device that executes mobile device applications and/or mobile device communication software, included in programs 314, that allows user device 300 to communicate with integration server system 116 and other components via communication network 114, to generate and display content in interfaces via display device 302. The disclosed embodiments are not limited to any particular configuration of user device 300. User device 300 may include any arrangement of one or more computing devices configured to perform one or more operations consistent with disclosed embodiments.

User device 300 may be configured to store, in memory 312, one or more operating systems that perform known operating system functions when executed by processor 308. By way of example, the operating systems may include Microsoft Windows™, Unix™ Linux™ Android™, Apple™ Mac OS operating systems, iOS, Chrome OS, or other types of operating systems. Accordingly, disclosed embodiments may operate and function with computer systems running any type of operating system. User device 300 may also include communication software stored in memory 312 that, when executed by processor 308, provides communications with communication network 114, such as Web browser software, tablet or smart handheld device networking software, etc.

Display device 302 may include, for example, a liquid crystal displays (LCD), a light emitting diode screens (LED), an organic light emitting diode screen (OLED), a touch screen, and other known display devices. Display device 302 may display various information to customers, drivers and merchants. For example, display device 302 may display an interactive interface enabling customers, drivers and merchants to operate user device 300 to perform certain aspects of the disclosed methods. Display device 302 may display touchable or selectable options for customers, drivers and merchants to select and may receive customer selection of options through a touch screen.

User device 300 includes I/O devices 304 that allows to send and receive information or interact with customers, drivers and merchants or another device. For example, I/O devices 304 may include various input/output devices, such as a keyboard, a mouse-type device, a gesture sensor, an action sensor, a physical button, switch, microphone, touchscreen panel, stylus, etc., that may be manipulated by customers, drivers and merchants to input information using user device 300. I/O devices 304 may also include an audio output device, such as a speaker configured to provide sound and audio feedback to customers, drivers and merchants operating user device 300. In some embodiments, I/O devices 304 may include a light emitting component, such as a LED or other component capable of providing a visible signal to customers, drivers and merchants. I/O devices 304 may also include haptic output devices, to provide haptic feedback to customers, drivers and merchants. I/O devices 304 may also include one or more communication modules (not shown) for sending and receiving information from other components in system 100 by, for example, establishing wired or wireless connectivity between user device 300 and communication network 114. I/O devices 304 may include radio frequency, infrared, or other near-field communication interfaces, for communicating with other devices associated with communication network 114. Exemplary communication modules of I/O devices 304 may include, for example, a short-range or near field wireless communication modem, a Wi-Fi™ communication modem, or a cellular communication modem. I/O devices 304 may include a transceiver or transmitter configured to communicate using one or more wireless technologies/protocols that may include, without limitation, cellular (e.g., 3G, 4G, etc.) technology, Wi-Fi™ hotspot technology, RFID, near-field communication (NFC) or BLUETOOTH® technologies, etc. More generally, any uni- or bi-directional communication technology known to one of ordinary skill in the art may be implemented in user device 300 to exchange information with integration server system 116 or remote database 120 via communication network 114.

As described above, user device 300 may be a device that executes mobile applications for performing operations consistent with disclosed embodiments. Thus, in some embodiments, programs 314 stored on user device 300 may include one or more software applications 316 installed thereon, that enable user device 300 to communicate with integration server system 116 via communication network 114 and perform aspects of the disclosed methods. For example, user device 300 may connect to integration server system 116 by using browser software to access and receive information or perform other operations associated with an internet service provider.

According to an exemplary embodiment, software applications 316 associated with integration server system 116 may be installed on user device 300, as shown in FIG. 3. For example, integration server system 116 may receive a request from customer device 102(1) to download one or more software applications 316 to user customer device 102(1). In one embodiment, integration server system 116 may receive the request from a customer associated with customer device 102(1), using a web browser application installed on customer device 102(1) respectively. In another embodiment, integration server system 116 may receive the request to download one or more software applications 316 associated with integration server system 116 onto customer device 102(1) from a webpage or another portal associated with integration server system 116 accessed via, e.g., customer device 102(1). In this embodiment, integration server system 116 may store software instructions corresponding to one or more software applications 316 in remote database 120. For responding to the download request, integration server system 116 may receive additional information from customer device 102(1) regarding the particular device specifications of customer device 102(1) to enable customer device 102(1) to download software instructions corresponding to the particular specifications. Alternatively, integration server system 116 may push a download request link to customer device 102(1) or transmit software code corresponding to one or more software applications 316 directly to customer device 102(1) in, for example, an e-mail, a text or short message service (SMS) message, a prompt through an app, or other suitable method. Customer device 102(1) may receive the software code related to one or more software applications 316, such as via communication network 114, to download and install the software code. Similarly, in another example, integration server system 116 may receive a request from a deriver associated with item delivery provider device 106(1) to download one or more software applications 316 onto the item delivery provider device 106(1). Further, similarly, in another example, integration server system 116 may receive a request from a merchant associated with item service provider device 110(1) to download one or more software applications 316 onto the item service provider device 110(1).

Figure 4A:
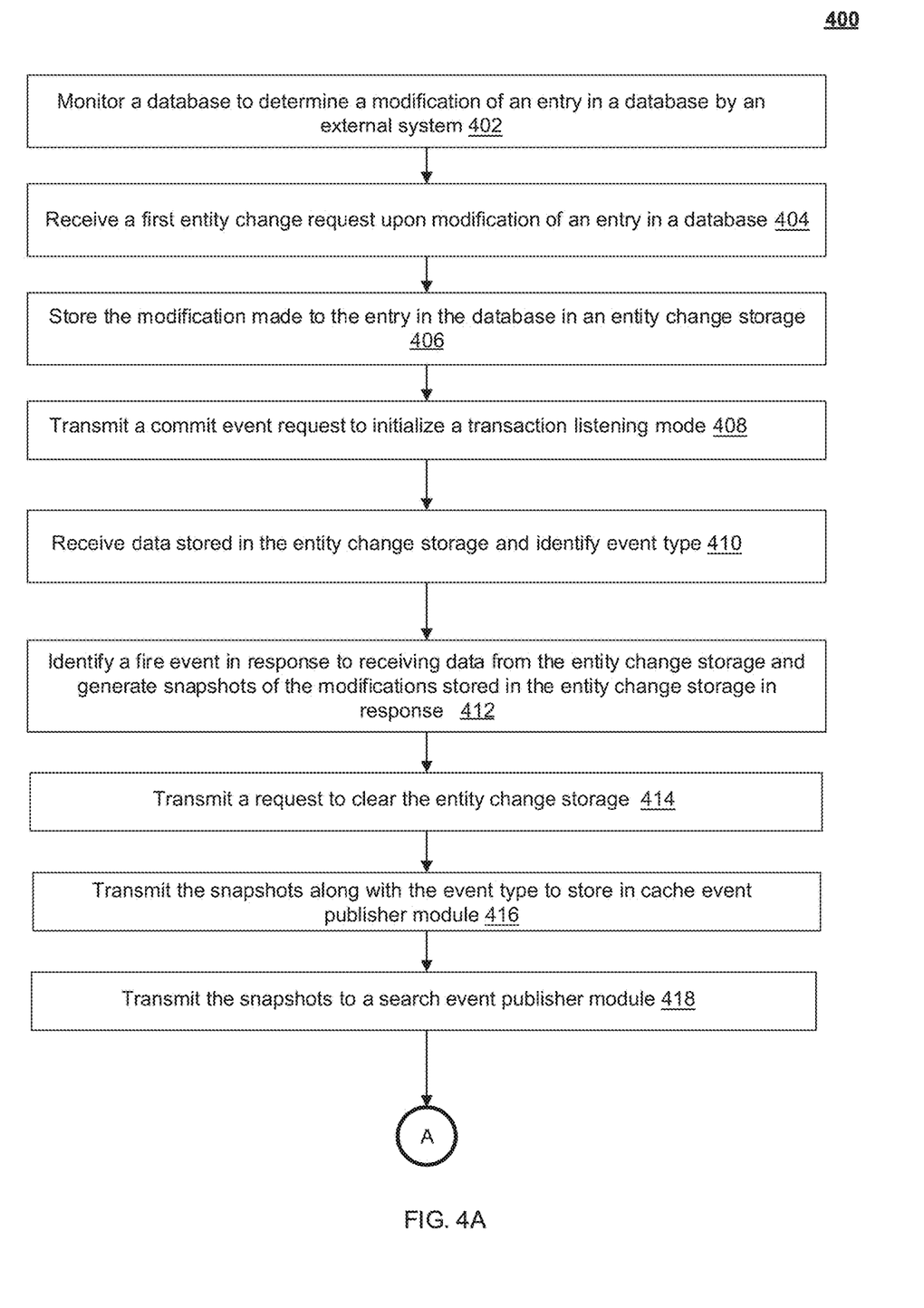
FIGS. 4A and 4B contains a detailed flowchart of an exemplary process of receiving and propagating efficient search updates in real time, consistent with disclosed embodiments.
Figure 4B:
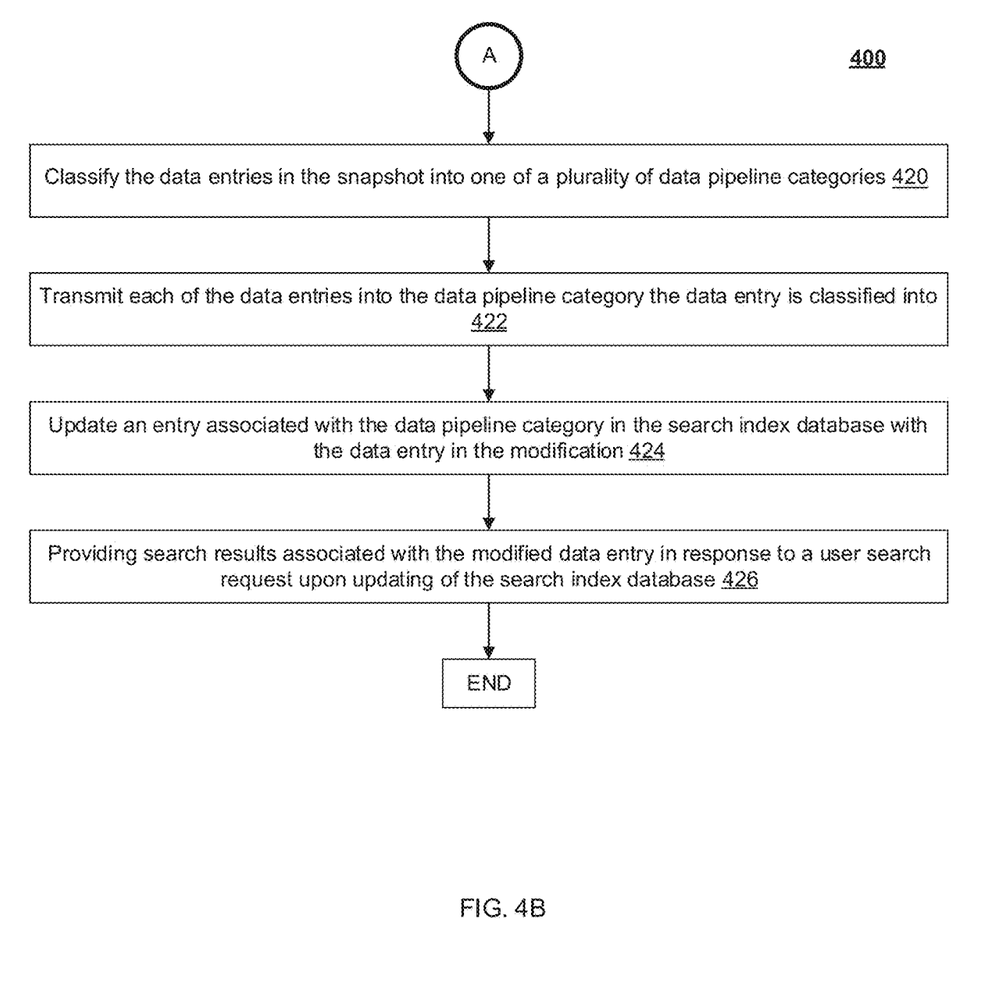

FIGS. 4A and 4B contain a flowchart of an exemplary process 400 implemented by integration server system 116 for receiving and propagating efficient search updates in real time, consistent with the disclosed embodiments. Integration server system 116 is implemented as a server device 200 of FIG. 2 to execute software instructions that perform one or more of the operations of process 400. Operations of process 400 are explained in association with FIG. 5.

Figure 5:
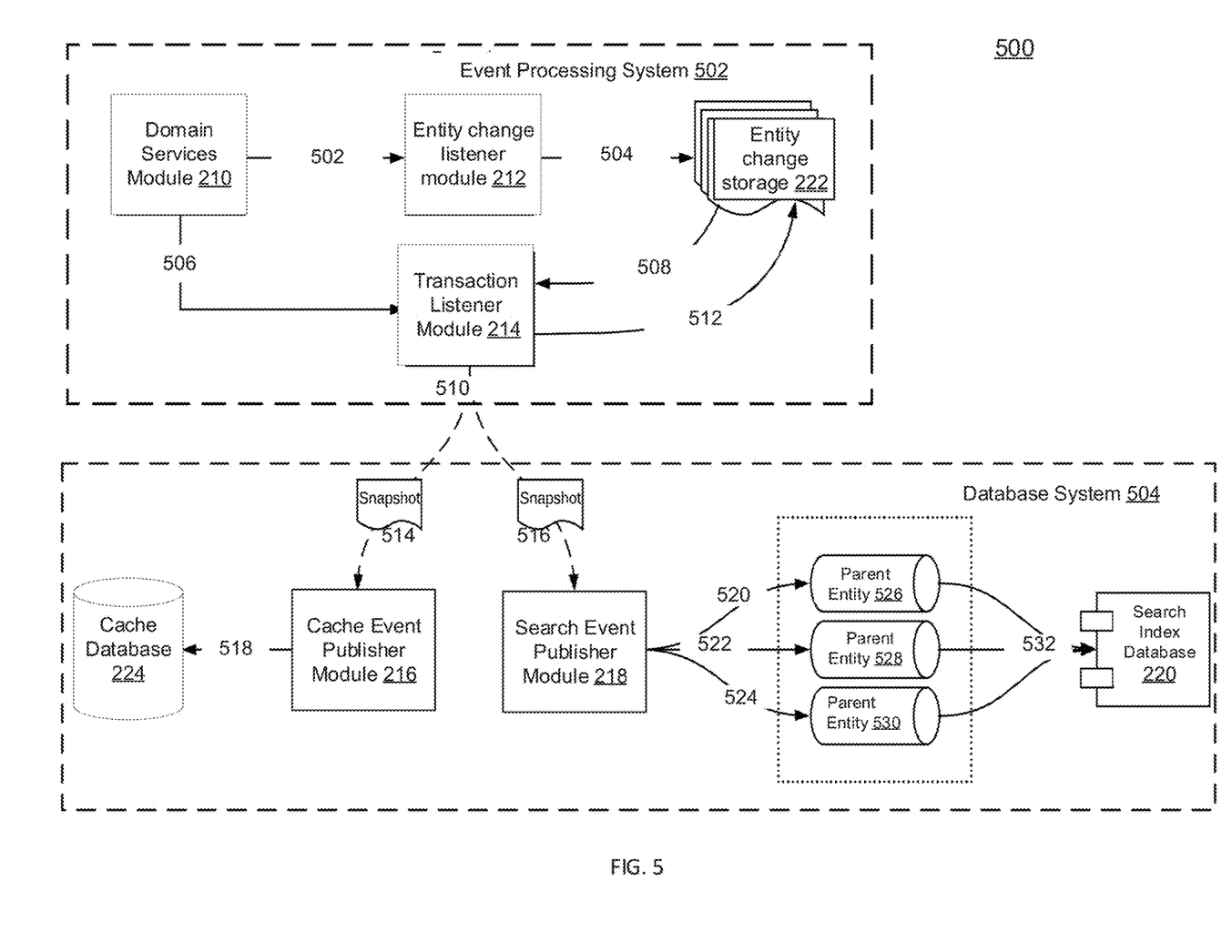
FIG. 5 contains a flow diagram illustrating an exemplary process of FIGS. 4A and 4B, consistent with disclosed embodiments.

FIG. 5 contains a flow diagram 500 illustrating an exemplary process of FIGS. 4A and 4B. FIG. 5 illustrates domain services module 210, entity change listener module 212, entity change storage 222, transaction listener module 214, of server device 200 in this example are implemented as event processing system 502. Further, cache database 224, cache event publisher module 216, search event publisher module 218, and search index database 220, of server device 200 in this example are implemented as database system 504. In some embodiments, event processing system 502 and database system 504 are part of integration server system 116.

In accordance with process 400, in step 402, domain services module 210 of integration server system 116 monitors a remote database 120 to determine a modification of entries by customer devices 102(1)-102(n), item delivery provider devices 106(1)-106(n), item service provider devices 110(1)-110(n). By way of example, with reference to FIG. 5, domain services module 210 monitors remote database 120 (not pictured) to determine if merchant profile information, customer profile information and driver profile information, stored as data entries in a remote database 120, are modified by customer devices 102(1)-102(n), item delivery provider device 106(1) and/or item service provider device 110(1)-110(n). Domain services module 210 may be configured to detect modification in remote database 120. Domain services module 210 detects any writing in the remote database 120.

By way of example, a merchant associated with item service provider device 110(1) at a merchant store 112(1), accesses their merchant profile information via an online website portal. The item service provider device 110(1) views the merchant profile information via a display on the item service provider device 110(1). Further, remote database 120 may store data, such as the merchant profile information, in a hierarchical structure. For example, the name of merchant store 112(1) may be a parent entity, while the store hours, menu name, photo album, address location, etc., are child entities that are stored under the parent entity. Further, menu information includes a plurality of categories, which includes Appetizers, Salads, Mexican cuisine, Entrée, Deserts, etc these entries would be categorized as child sub entities under the menu name child entity. For example, merchant profile information may include store hours as 8:00 am to 5:00 μm, for the merchant store 112(1). A merchant of Item service provider device 110(1) modifies store hours from 8:00 am to 5:00 pm to new timings of 9:00 am to 6:00 pm. This modification causes an update in store hours entry at the remote database 120 for the merchant store 112(n). This update of store hours entry at the remote database 120 is determined by domain services module 210 based on monitoring the remote database 120. Similarly, multiple modifications may be performed by each of a plurality of merchants, customers and/or drivers in their corresponding merchant profile information, customer profile information and/or driver profile information to result in multiple entity change request to be generated.

By providing a hierarchical structure this technology provides technical advantages of an optimized process that reduces data overhead. By providing a hierarchical structure this technology identifies a specific location where a modification is made, and thus generates an entity change request that includes information directed to updating the search index database 220 information associated with only that parent entity, child entity, and/or child sub entity that has been modified, instead of generating an entity change request to update entire menu information upon a change in a child sub entity, which requires extra data overhead.

In step 404, entity change listener module 212 of integration server system 116 receives a first entity change request upon modification of an entry in remote database 120. Upon determining modification of an entry in step 402, domain services module 210 transmits a first entity change request. The first entity change request includes information corresponding to the entity that has been modified. By way of example, when a price associated with an item within an Appetizer category of a menu is modified, then the first entity change request would include an entity identifier associated with the child sub entity of Appetizer category and the modification information which in this example is the, price associated with the item within the Appetizer category. Further, the entity identifier may be an address within a lookup table stored in the search index database 220. As shown in FIG. 5 step 502.

In another example, when merchant modifies store hours information for merchant 112(1), a domain services module 210 monitors remote database 120 (as explained in step 402) and upon determining a modification of a data entry, domain services module 210 transmits a first entity change request. The first entity change request includes an identifier associated with the child entity of store hours and the modification information which in this example, is the change in hours from 8:00 am to 5:00 pm to new timings of 9:00 am to 6:00 pm. Similarly, a plurality of merchants, customers and/or drivers in the corresponding merchant profile information, customer profile information and/or driver profile information respectively over the time period for which the transaction listener module 214 receives the pushed data from the entity change storage 222. The customer devices 102(1)-102(n), item delivery provider devices 106(1)-106(n), item service provider devices 110(1)-110(n) and remote database 120 may be referred to as an external system.

In step 406, entity change listener module 212 of integration server system 116 stores the modification made to the entry in an entity change storage 222. Storing is also referred to as saving the modification made to the entry in an entity change storage 222. Upon receiving the first entity change request, the integration server system 116 stores the identifier associated with the entry that has been modified and the modification information included in the first entity change request. By way of example, when the first entity change request identifies the entry to be modified as a price of an item within an Appetizer category of a menu, then the integration server system 116 stores the entity identifier associated with the child sub entity of Appetizer category and the modification information which in this example is the price associated with the item within the Appetizer category in the entity change storage 222. Similarly, the identifier associated with the entry that has been modified and the modification information in entity change requests generated based on multiple modifications performed by the plurality of merchants, customers and/or drivers in their corresponding merchant profile information, customer profile information and/or driver profile information are also stored in the entity change storage 222. As shown in FIG. 5 step 504.

In step 408, domain services module 210 of integration server system 116 transmits a commit event request to initialize a transaction listening mode at transaction listener module 214. Domain services module 210 generates a commit event request upon transmitting of the first entity change request in step 402. This is depicted in step 506 of FIG. 5.

In step 410, entity change storage 222 of integration server system 116 pushes the data stored in step 406 to transaction listener module 214. Transaction listener module 214 of integration server system 116 initializes a transaction listening mode upon receiving the commit event request from domain service module 210. Upon initialization of transaction listening mode, transaction listener module 214 waits to listen for data to be received from entity change storage 222. Entity change storage 222 pushes the data stored in step 406 to transaction listener module 214. Transaction listener module 214 identifies entity identifiers and corresponding modification information from the received data. The pushing of the data from entity change storage 222 is performed in real time. In some embodiments, as soon as the data is stored in entity change storage 222, the data is immediately pushed to transaction listener module 214. A plurality of identifiers associated with the entries that are changed and the corresponding modification associated with those entries is pushed by entity change storage 222. Similarly, data pushed to the transaction listener module 214 and stored in the entity change storage 222 may include a plurality of modifications made by a plurality of merchants, customers and/or drivers in the corresponding merchant profile information, customer profile information and/or driver profile information respectively over the time period for which the transaction listener module 214 receives data from the entity change storage 222, as shown in step 508 of FIG. 5.

In another example, the pushing of the data from entity change storage 222 is performed at regular intervals of time periods. The time period may include 1 microsecond, 1 second, 5 seconds, 5 minutes, 1 hour and/or 24 hours, although any other time period may also be included. The data pushed from the entity change storage 222 includes a plurality of identifiers associated with the entries that are changed and the corresponding modification associated with those entries during the time periods.

In another example, transaction listener module 214 fetches the data stored in step 406 at the entity change storage 222. The fetched data may include an identifier associated with the entry that has been modified and the modification information included in the first entity change request. For example, the entity identifier associated with the child sub entity of Appetizer category and the modification information which in this example is the price associated with the item within the Appetizer category in the entity change storage 222.

Transaction listener module 214 identifies event type associated with entity identifier, upon receiving the entity identifier from the entity change storage 222, either by pushing of the data stored in step 406 by the entity change storage 222 to the transaction listener module 214 or by fetching of the data stored in step 406 at the entity change storage 222 by transaction listener module 214. Identified event type includes a location associated with the entity identifier in the hierarchical structure. By way of example, event type may include location associated with only that parent entity, child entity, and/or child sub entity that has been modified.

In step 412, transaction listener module 214 of integration server system 116, identifies a fire event in response to receiving the data stored in the entity change storage 222. A fire event is an event for generating a plurality of snapshots of data received from entity change storage 222. Transaction listener module 214 identifies initialization of a fire event in response to receiving the data stored in entity change storage 222. Initialization of a fire event causes transaction listener module 214 to generate a plurality of snapshots of the data received from the entity change storage 222 in step 410. Upon identifying the fire event, transaction listener module 214 of integration server system 116 generates snapshots of the data pushed by the entity change storage 222. By way of example, a snapshot is a copy of the data received from the entity change storage 222 by the transaction listener module 214 in step 410. In another example, a snapshot would be a database table that includes reference indicators to the data stored in the entity change storage 222. As shown in FIG. 5, step 510, two snapshots being transmitted via the 514 path and 516 path. These snapshots have the same data contents that are being transmitted.

In step 414, transaction listener module 214 of integration server system 116, transmits a request to clear the entity change storage 222. Upon receiving the data pushed by the entity change storage 222, the transaction listener module 214 transmits a request to clear the data that has been pushed by the entity change storage 222. Upon receiving the request to clear the data, the entity change storage 222 deletes the data that has been pushed. This is depicted in step 512 of FIG. 5.

In step 416, transaction listener module 214 of integration server system 116, transmits one of the snapshots along with the corresponding event type identified in step 410 to cache event publisher module 216. The cache event publisher module 216 then stores the snapshot data in cache database 224. When a request to access the modified merchant profile information, customer profile information, and/or driver profile information from search index database 220 is received, and if the search index database 220 is overloaded and is not available to provide the data immediately, in this scenario, the snapshot stored in the cache database 224 is then utilized to facilitate the request. The request is serviced by the snapshot data stored at the cache database 224. As shown in FIG. 5 step 514, a first one of the snapshots is transmitted to cached event publisher module 216.

In step 418, transaction listener module 214 of integration server system 116, transmits the snapshots to a search event publisher module 218. Search event publisher module 218 stores the snapshots. As shown in FIG. 5 step 516, a second one of the snapshots along with the corresponding event type identified in step 410 is transmitted to search event publisher module 218.

Proceeding to FIG. 4B, in step 420, search event publisher module 218 of integration server system 116, the search event publisher module 218 utilizes the event type received along with the snapshot to determine a location associated with the modified entity. Based on the determined location the search event publisher module 218 classifies the data entries in the snapshot into a one of a plurality of data pipeline categories. Search event publisher module 218 is a streaming service that classifies the data entries in the snapshot into multiple streams based on the type of category and forwards it along the streams to data pipeline categories. The pipeline categories include parent entity associated with one of a merchant stores 112(1)-112(n). By way of example, the pipeline category 526 may be associated with a merchant store 112(1), the pipeline category 528 may be associated with a merchant store 112(n). Based on the type of location identified in the event type, the search event publisher module 218 determines one of the data pipelines 526-530 corresponding to be as the location identified in the event type and transmits the data entry to the corresponding one of the data pipelines 526-530.

In another embodiment, pipeline categories include parent entity, child entity, child sub entity, although any other categories may also be included. By way of example, the data pipelines 526, 528 and 530 of FIG. 5 may be a parent entity data pipeline 526, child entity data pipeline 528 and child sub entity data pipeline 530 [not shown in FIG. 5]. Search event publisher module 218 transmits data entries classified as parent entity in step 420 as a first stream to a parent entity data pipeline 526, further search event publisher module 218 may transmit a second stream of a child entity data pipeline 528 for data entries classified as child entity and search event publisher module 218 may transmit a third stream of a child sub entity data pipeline 530 for data entries classified as child sub entity. Merchant profile information is stored, in a hierarchical structure. For example, the name of merchant store 112(1) may be a parent entity, while the store hours, menu name, photo album, address location, etc., are child entities that are stored under the parent entity as child entities. In this example, the name of merchant store 112(1) is a parent entity. Store hours, menu name, photo album, address location, etc., may be child entities that are stored under the parent entity. Further, menu information may include a plurality of categories, which includes Appetizers, Salads, Mexican cuisine, Entrée, Deserts, etc. these entries may be categorized as child sub entities under the menu name child entity. In another example, pipeline categories include Appetizers, Salads, Mexican cuisine, Entrée, Deserts.

In step 422, search event publisher module 218 of integration server system 116, identifies where within the hierarchical structure a particular modification has been made and categorizes that data entry to be a parent entity, child entity or sub child entity based on where the modification was made. Upon identifying the category associated with the data entry, search event publisher module 218 transmits each of the data entries in a corresponding data pipeline that is classified into based on the classification performed in step 420. As one example, in step 420, search event publisher module 218 identifies the type of location based on the event type, the search event publisher module 218 determines one of the data pipelines 526-530 corresponding to be as the location identified in the event type and transmits the data entry to the corresponding one of the data pipelines 526-530. When search event publisher module 218 identifies the location associated with the data entry based on the event type corresponds to a location in the data pipeline 526, then the data entry is transmitted to data pipeline 526 by the search event publisher module 218. As another example, in step 420, search event publisher module 218 may identify that a received entity change comprises modifying store hours from 8:00 am to 5:00 pm to new timings of 9:00 am to 6:00 μm. In response, search event publisher module 218 identifies that the data entry of store hours is a child entry data and accordingly transmits the identifier of store hours and the modification information associated with the store hours, which in this example is, modifying the time from 8:00 am to 5:00 pm to new timings of 9:00 am to 6:00 pm, to the child entity data pipeline 528. Similarly, data entries classified as parent entity would be transmitted over 520 to the parent entity data pipeline 526 by the search event publisher module 218, and data entries classified as child sub entries would be transmitted over 524 to the child sub entry data pipeline 530 by the search event publisher module 218.

In step 424, the search index database 220 of integration server system 116 receives the classified data from parent entity data pipeline 526, child entity data pipeline 528 and/or child sub entity data pipeline 530 over the flow 532. Search index database 220 receives the data from the parent entity data pipeline 526 and updates the data entry associated with the parent entity. Similarly, search index database 220 receives the data from the child entity data pipeline 528 and updates the data entry associated with the child entity. Similarly, search index database 220 receives the data from the child sub entity data pipeline 530 and updates the data entry associated with the child sub entity.

In step 426, search index database 220 of integration server system 116, receives a user search request to access data entry from within merchant profile information, customer profile information, and/or driver profile information.

Upon receiving the user search request search index database 220 provides a response to include search results associated with the modified data entry updated in step 424 corresponding to the data entry included in the user search request.

Figure 6:
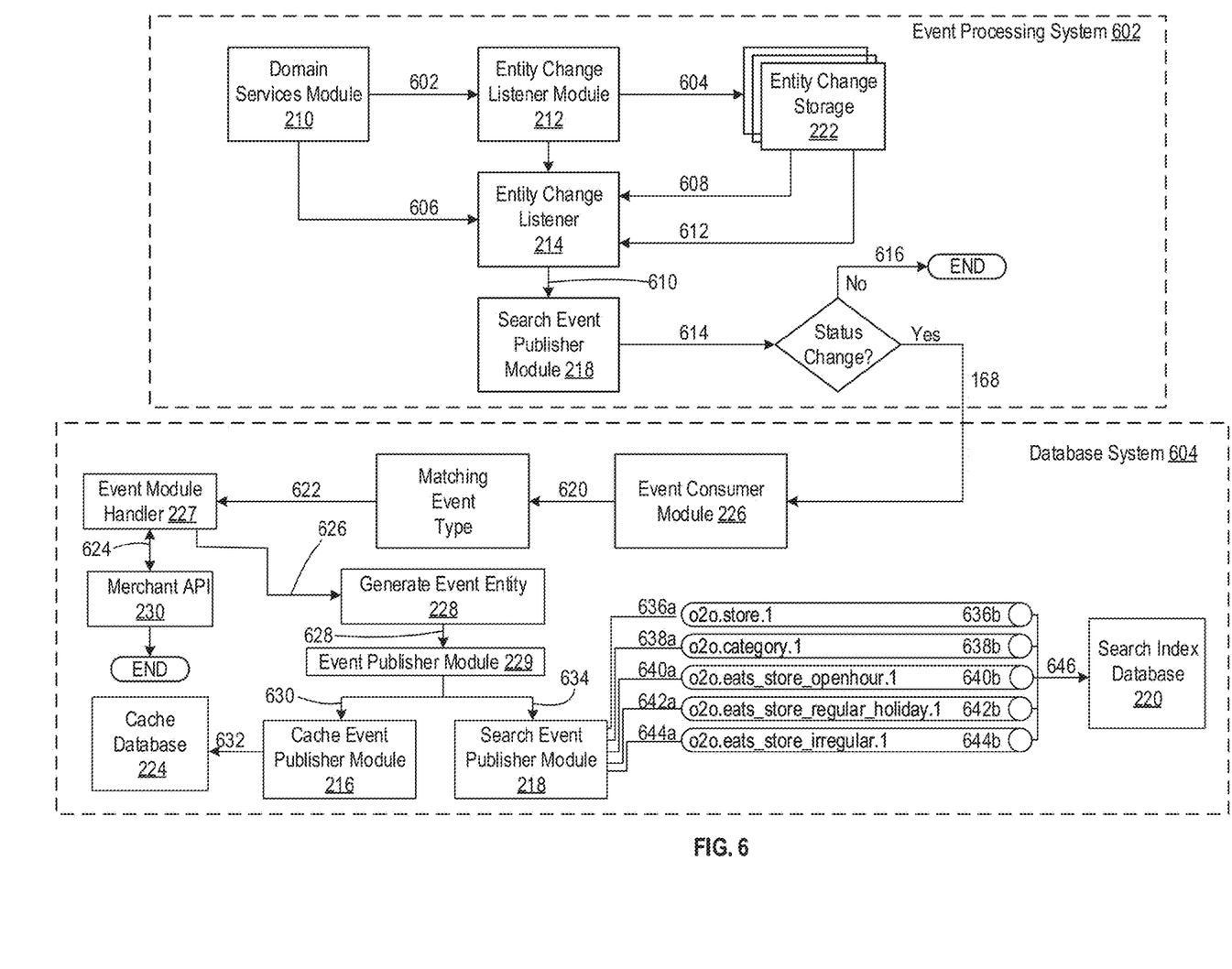
FIG. 6 contains a flow diagram illustrating an alternative embodiment of FIG. 5 illustrating an exemplary process of FIGS. 4A and 4B, consistent with disclosed embodiments.

FIG. 6 shows an alternate embodiment of FIG. 5 that contains a flow diagram illustrating an exemplary process of FIGS. 4A and 4B. FIG. 6 illustrates domain services module 210, entity change listener module 212, entity change storage 222, transaction listener module 214, and search publisher module 218, of server device 200 in this example. In this example embodiment, these modules are implemented as event processing system 602. Further, event consumer module 226, event handler module 227, generate event entity 228, event publisher module 229, merchant application programming interface (API) 230, cache database 224, cache event publisher module 216, search event publisher module 218, and search index database 220, of server device 200 in this example are implemented as database system 604. In some embodiments, event processing system 602 and database system 604 are part of integration server system 116.

In accordance with process 400 (FIGS. 4A and 4B) and FIG. 5, steps 602 is substantially similar to step 502. Step 604 is substantially similar to step 604. Step 606 is substantially similar to step 506. Step 608 is substantially similar to step 508.

In some embodiments, step 610 is substantially similar to step 510. In other embodiments, when, transaction listener module 214 of integration server system 116, identifies a fire event in response to receiving the data stored in the entity change storage 222. A fire event is an event for transmitting the data received from entity change storage 222 to search event publisher module 218. Transaction listener module 214 identifies initialization of a fire event in response to receiving the data stored in entity change storage 222. Initialization of a fire event causes transaction listener module 214 of integration server system 116, to transmit the received data to a search event publisher module 218 depicted in step 610. In step 612, transaction listener module 214 of integration server system 116, transmits a request to clear the entity change storage 222. Upon receiving the data pushed by the entity change storage 222, the transaction listener module 214 transmits a request to clear the data that has been pushed by the entity change storage 222. Upon receiving the request to clear the data, the entity change storage 222 deletes the data that has been pushed.

Search event publisher module 218 stores the received data from the flow 610 and then proceeds to determine if the received data includes data that has been modified, as depicted in step 614. Here, search event publisher module 218 compares the received data with corresponding data previously stored on the search event publisher module 218 to determine if data has been modified. When search event publisher module 218 determines that the received data does not include data that has been modified, then the method proceeds to flow 616 and the method ends here. However, when search event publisher module 218 determines that the received includes data that has been received modified then the data that has been modified is transmitted to event consumer module 226 as depicted by flow 618. Event consumer module 226 proceeds to determine if there is a matching event type based on received data depicted by flow 620. Event consumer module 226 determines if the received data has been identified to be modified matches with an event type. Event type may include a modification of a parent entity, child entity, or sub child entity based on identifying where the modification was made in the data that has been identified to be modified. Upon identifying the event type, e.g. the modification to be made at a child entity, then event consumer module 226 transmits the data that has been identified to be modified to event handler module 227, as depicted by flow 622. Event handler module 228 then updates a merchant application programming interface (API) 230 to and get updated data to reflect the modification made, as depicted by flow 624. Upon updating the merchant API 230, the event handler module 227 then proceeds to transmit the data that has been identified to be modified to generate event entity module 228, as depicted by 626. Generate entity module 228 then generates multiple snapshots of the data that has been identified to be modified. By way of example, a snapshot is a copy of the data that has been identified to be modified in step 410. In another example, a snapshot would be a database table that includes reference indicators to the data stored in the entity change storage 222. Multiple snapshots refers to multiple copies of the same data that has been identified to be modified. Generate entity module 228 then transmits the multiple copies of the same data that has been identified to be modified to the event publisher module 229. Event publisher module 229, transmits one of the snapshots to cache event publisher module 216 via flow 630. The cache event publisher module 216 then stores the snapshot data in cache database 224. Event publisher module 229 also transmits, a second one of the snapshots to search event publisher module 218.

Search event publisher module 218 of integration server system 116 identifies where within the hierarchical structure a particular modification has been made and categorizes that data entry to be a parent entity (e.g. store information), child entity (menu information of the store) or sub child (store open hours, store open information during holidays, store irregular hours during holidays) based on where the modification was made. In this example, store information is associated with data pipeline 636b, menu information of the store is associated with data pipeline 638b, and store open hours information is associated with data pipeline 640b, store open information during holidays is associated with data pipeline 642b, and store irregular hours during holidays is associated with data pipeline 644b. Upon identifying the category associated with the data entry, search event publisher module 218 transmits each of the data entries in a corresponding data pipeline that is associated with that category into based on the classification performed. Further, search event publisher module 218 may transmit the modified data entries corresponding to information of the store via flow 636a to data pipeline 636b. Search event publisher module 218 may transmit modified data entries corresponding to menu information of the store via flow 638a to data pipeline 638b. Search event publisher module 218 may transmit modified data entries corresponding to store open hours information via flow 640a to data pipeline 640b. Search event publisher module 218 may transmit modified data entries corresponding to store open information during holidays via flow 642a to data pipeline 642b. Search event publisher module 218 may transmit modified data entries corresponding to store irregular hours during holidays via flow 644a to data pipeline 644b. Further, step 646 is substantially similar to step 532.

The disclosed embodiments provide an improved method of receiving and propagating efficient search updates. By providing technical advantages of an optimized process of reducing data overhead and providing a real time process of search updating. As this technology provides a real time search updating process by pushing of data stored in entity change storage, this technology provides a fast and reliable process of reflecting modifications made to a database, which results in faster time displaying of modifications as part of search results. Thus, this technology reduces delays caused during updating of data entries. Further, this technology identifies a specific location where a modification is made, and thus generates an entity change request that includes information directed to updating a search index database information associated with only that parent entity, child entity, and/or child sub entity that has been modified. Thus, this technology reduces data overhead, instead of generating an entity change request to update entire menu information upon a change in a child sub entity, which requires extra data overhead.

In contrast, in the prior art, other strategies that have been implemented are inefficient as they require extra data overhead, which may not be beneficial to efficiently utilize network resources and thus increase network load. Further the prior art causes significant delays during a search updating process, while the disclosed embodiments provides a real time update process, that reduces delays between reflecting modifications made to data entries.

While illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Thus, the foregoing description has been presented for purposes of illustration only. It is not exhaustive and is not limiting to the precise forms or embodiments disclosed. Modifications and adaptations will be apparent to those skilled in the art from consideration of the specification and practice of the disclosed embodiments.

The elements in the claims are to be interpreted broadly based on the language employed in the claims and not limited to examples described in the present specification or during the prosecution of the application, which examples are to be construed as non-exclusive. It is intended, therefore, that the specification and examples be considered as exemplary only, with a true scope and spirit being indicated by the following claims and their full scope of equivalents.

The invention claimed is:

1. A computer-implemented system for receiving and propagating efficient search updates, the system comprising:
   a memory storing instructions; and
   at least one processor configured to execute the instructions to:
      receive, from an external system, a request to begin a transaction;
      receive, from the external system via a network, a plurality of entity change requests;
      determine, based on the received plurality of entity change requests, a resulting entity change request to modify data in an entity associated with the external system, wherein each entity comprises a plurality of sub-entities;
      save the resulting entity change request to an entity store;
      push the resulting entity change request from the entity store to an event publisher;
      in response to pushing the resulting entity change request from the entity store, receive a request to clear the entity store of all pushed entity change requests;
      clear the entity store of all pushed entity change requests;
      generate a plurality of snapshots of the resulting entity change request by the event publisher;
      classify the resulting entity change request based at least on one of the plurality of snapshots, wherein the classification of the resulting entity change request is a parent entity or a sub entity;
      forward the classified entity change request to a search index database via a data pipeline associated with the classification of the first resulting entity change request; and
      update the search index based on the classified entity change request.

2. The system of claim 1, wherein each entity change request comprises a request to modify a sub-entity of a respective entity.

3. The system of claim 1, wherein the resulting entity change request comprises a change to a service, a change to an item, or a change to data associated with the external system.

4. The system of claim 1, wherein the instructions further cause the processor to:
   monitor a database via the network to detect a modification of the entity stored at the database by the external system via the network; and
   determine the resulting entity change request in response to detecting a modification of the entity.

5. The system of claim 4, wherein pushing the resulting entity change request from the entity store to the event publisher and the second event publisher comprises formatting the resulting entity change request as a snapshot.

6. The system of claim 5, wherein the instructions further cause the processor to:
   rollback a modification to an entity associated with the external system;
   search the cache database to determine a plurality of snapshots needed to reverse.

7. The system of claim 1, wherein forwarding the classified entity change request to a search index comprises forwarding the classified entity change request to the search index via a real-time stream selected based on the classification of the entity change.

8. A computer implemented method for receiving and propagating efficient search updates, the method comprising:
   receiving, from an external system, a request to begin a transaction;
   receiving, from the external system via a network, a plurality of entity change requests;
   determining, based on the received plurality of entity change requests, a first resulting entity change request to modify data in an entity associated with the external system, wherein each entity comprises a plurality of sub-entities;
   saving the resulting entity change request to an entity store;
   pushing the resulting entity change request from the entity store to an event;

in response to pushing the resulting entity change request from the entity store, receiving a request to clear the entity store of all pushed entity change requests;

clearing the entity store of all pushed entity change requests;

generate a plurality of snapshots of the resulting entity change request by the event publisher;

classifying the resulting entity change request based at least on one of the plurality of snapshots, wherein the classification of the resulting entity change request is a parent entity or a sub entity;

forwarding the classified entity change request to a search index database via a data pipeline associated with the classification of the resulting entity change request;

updating the search index based on the classified entity change request.

9. The method of claim 8, wherein each entity change request comprises a request to modify a sub-entity of a respective entity.

10. The method of claim 8, wherein the resulting entity change request comprises a change to a service, a change to an item, or a change to data associated with the external system.

11. The method of claim 8, further comprising:
monitoring a database via the network to detect a modification of the entity stored at the database by the external system via the network; and
determining the resulting entity change request in response to detecting a modification of the entity.

12. The method of claim 11, wherein pushing the resulting entity change request from the entity store to the event publisher and the second event publisher comprises formatting the resulting entity change request as a snapshot.

13. The method of claim 12, further comprising:
rollback a modification to an entity associated with the external system;
search the cache database to determine a plurality of snapshots needed to reverse.

14. The method of claim 8, wherein forwarding the classified entity change request to a search index comprises forwarding the classified entity change request to the search index via a real-time stream selected based on the classification of the entity change.

15. A computer-implemented system for receiving and propagating efficient search updates, the system comprising:
a memory storing instructions; and
at least one processor configured to execute the instructions to:
receive, from an external system, a request to begin a transaction;
receive, from the external system via a network, a plurality of entity change requests;
determine, based on the received plurality of entity change requests, a resulting entity change request to modify data in an entity associated with the external system, wherein each entity comprises a plurality of sub-entities;
save the resulting entity change request to an event store;
push the resulting entity change request from the event store to an event publisher;
push the resulting entity change request from the event store to a second event publisher for storage in a cache database, wherein pushing the resulting entity change request from the event store to the event publisher and the second event publisher comprises formatting the resulting entity change request as a snapshot;
in response to pushing the resulting entity change request from the event store, receive a request to clear the event store of all entity change requests;
clear the event store of all pushed entity change requests;
generate a plurality of snapshots of the resulting entity change request by the event publisher;
classify the resulting entity change request based at least on one of the plurality of snapshots, wherein the classification of the resulting entity change request is a parent entity or a sub entity;
forward the classified entity change request to a search index database via a data pipeline associated with the classification of the resulting entity change request; and
update the search index based on the classified entity change request.

* * * * *

UNITED STATES PATENT AND TRADEMARK OFFICE
CERTIFICATE OF CORRECTION

| | | |
|---|---|---|
| PATENT NO. | : 11,803,593 B2 | Page 1 of 1 |
| APPLICATION NO. | : 16/791413 | |
| DATED | : October 31, 2023 | |
| INVENTOR(S) | : Seung Won Lee | |

It is certified that error appears in the above-identified patent and that said Letters Patent is hereby corrected as shown below:

In the Claims

Claim 1, Column 18, Line 16, "the first resulting" should read --the resulting--.

Claim 8, Column 18, Line 60, "a first resulting" should read --a resulting--.

Signed and Sealed this
Twenty-first Day of May, 2024

Katherine Kelly Vidal
*Director of the United States Patent and Trademark Office*